United States Patent
Thompson

(10) Patent No.: US 7,934,975 B2
(45) Date of Patent: May 3, 2011

(54) WATER JET STRIPPING AND RECONTOURING OF GAS TURBINE BUCKETS AND BLADES

(75) Inventor: Christopher E. Thompson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 683 days.

(21) Appl. No.: 11/881,823

(22) Filed: Jul. 27, 2007

(65) Prior Publication Data

US 2008/0153390 A1    Jun. 26, 2008

Related U.S. Application Data

(62) Division of application No. 11/639,065, filed on Dec. 13, 2006, now Pat. No. 7,335,089.

(51) Int. Cl.
   *B24B 49/00*    (2006.01)

(52) U.S. Cl. ............ 451/5; 382/141; 451/38; 451/75; 114/222; 239/227; 239/252; 239/258; 700/160

(58) Field of Classification Search .......... 451/5, 38, 451/75; 382/141; 700/160; 114/222; 239/227, 239/252, 258

See application file for complete search history.

(56) References Cited

U.S. PATENT DOCUMENTS

| | | | |
|---|---|---|---|
| 5,167,721 A | 12/1992 | McComas et al. | 134/32 |
| 5,704,824 A | 1/1998 | Hashish et al. | |
| 5,937,080 A | 8/1999 | Vogeley et al. | 382/110 |
| 5,947,387 A * | 9/1999 | Zink et al. | 239/227 |
| 6,074,135 A * | 6/2000 | Tapphorn et al. | 406/46 |
| 6,189,473 B1 | 2/2001 | Appel et al. | 114/222 |
| 6,699,101 B2 * | 3/2004 | Annigeri et al. | 451/5 |
| 6,905,396 B1 | 6/2005 | Miller et al. | |
| 7,544,112 B1 | 6/2009 | Miller et al. | |
| 2004/0219290 A1 * | 11/2004 | Nagaraj et al. | 427/140 |
| 2004/0256504 A1 * | 12/2004 | Segrest et al. | 241/1 |
| 2005/0224474 A1 * | 10/2005 | Kilburn | 219/121.68 |

* cited by examiner

*Primary Examiner* — Ramesh B Patel
*Assistant Examiner* — Tejal J Gami
(74) *Attorney, Agent, or Firm* — Edward J. Smith; Ernest G. Cusick; Frank A. Landgraff

(57) ABSTRACT

A method for water jet stripping and recontouring of a coated article of manufacture is provided. The method includes dimensionally scanning the coated article and establishing a three-dimensional model for the coated article. The method further includes establishing a set of reduced dimensional profiles for recontouring and then analyzing whether the reduced profiles are satisfactory for subsequent operation. A jet spraying program is established for removal of the coating and the surface base material to each predetermined reduced dimensional profile.

9 Claims, 7 Drawing Sheets

WATER JET STRIPPING AND RECONTOURING OF GAS TURBINE BUCKETS AND BLADES

CROSS REFERENCE TO RELATED APPLICATIONS

This application is a divisional application of U.S. patent application Ser. No. 11/639,065, filed on Dec. 13, 2006, now U.S. Pat. No. 7,335,089 the disclosure of which is incorporated by reference.

BACKGROUND OF THE INVENTION

The invention relates generally to a method for water jet stripping and recontouring coated articles of manufacture and more specifically to a method for water jet stripping and recontouring coated buckets and blades for gas turbines.

Gas turbine buckets and blades often experience cracking on the surface of the parts. These cracks may extend into the "base-metal" or casting to significant depths. Many times, this cracking is caused when cracks initiate in a brittle or non-ductile coating and then continue to propagate into the "base-metal" or casting to significant depths. In order to affect a repair, it is common that the cracks must be removed prior to continued engine service. Typically, this repair involves removing the coating by chemical or mechanical means and then mechanically removing material, usually through manual grinding or computer numerical control (CNC) machining, until the cracks have been eliminated. However, the problem of cracks extending through an outer coating and into a base metal is not limited to turbine buckets and blades, or turbine parts in general, but extend to a broad range of articles of manufacture.

Cracks found on the surface of gas turbine hardware after engine operation, especially buckets, often must be removed as part of the repair process. This removal of these cracks is typically achieved by grinding (blending) away metal on the surface of the part until the cracks have been removed. This material removal is typically done by manual grinding, which is very labor intensive, or by CNC machining, which is extremely time consuming. Manual grinding for defect removal may result in the creation of uncontrolled shapes that do not conform with the original design profile of the article.

Miller et al. (U.S. Pat. No. 6,905,396) provides a method of removing a coating from a substrate with a pressurized abrasive water jet while moving the abrasive water jet and/or the component relative to one another to fully expose the coating to the fluid stream. Hashish et al. (U.S. Pat. No. 5,704,824) describes a method and apparatus for milling objects by means of a high velocity abrasive water jet. Control means are provided that allow uniform and variable depth of milling of complex shapes and automatic variation in relative speed, standoff distance, angle and pressure. Miller et al. and Hashish et al. do not address a one-setup process for removing the coating and the surface defect from an article of manufacture and recontouring the surface.

Accordingly, there is a need to provide a method for removal of cracks and surface imperfections in the base metal of these articles of manufacture, which have an outer coating, and to perform the process in one setup. Further is a need to maintain the contoured shape of the original article without deforming the shape as often occurs in a manual repair. Still further, there exists a need to perform the process quickly and at a low cost.

BRIEF DESCRIPTION OF THE INVENTION

The present invention relates to a method for removal of cracks and surface imperfections in the base metal of articles of manufacture, which have an outer coating, and to perform the process in one setup. The method maintains the contoured shape of the original article without deforming the shape as often occurs in a manual repair and may perform the process quickly and at low cost.

Briefly in accordance with one aspect of the present invention, a method for creating water jet stripping and recontouring program for a coated article of manufacture is provided. The method includes dimensionally scanning the coated article and establishing a three-dimensional model for the coated article. The method further includes establishing a jet spraying program for removal of the specific coating and a jet spraying program for removal of the surface base material. After the three-dimensional model is established, a predetermined set of reduced dimensional profiles for contouring is applied to the model in order to establish a jet spraying program. The resulting final dimensional profiles for recontouring are analyzed to determine whether the reduced profiled are satisfactory for continued operation.

According to a second aspect of the invention, a method for water jet stripping and recontouring of a coated article of manufacture is provided. The method includes first determining a depth of damage on the base surface of the article and then selecting a recontour profile from a predetermined set of reduced contour profiled for the article to eliminate the defect in the base metal. A selection is made of a jet-spray program for a specific coating on the article and another selection is made for a jet-spray program for a specific alloy composition of the article. The jet spray programs are then applied to remove the specific coating and the damage on the base surface of the article to the reduced contour profile.

According to a third aspect of the invention, a method for water jet stripping and recontouring of a coated article of manufacture is provided. The method includes dimensionally scanning the article and then determining that the scanned article is within a predetermined deviation from the nominal design shape of the article. The method further includes determining a depth of damage on the base surface of the article. Dependent upon the type of coating on the article, a jet-spray program is selected for removal of the coating. Based on a specific alloy composition of the article, a jet-spray program is selected for removal of the removal of damage in the base material. The jet-spray programs are then applied to remove a predetermined depth from the base surface of the article.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The following embodiments of the present invention have many advantages, including using an adaptive computer numerical-controlled (CNC) controlled water-jet program to both remove an old surface coating and to remove material to pre-determined contours, effectively re-surfacing the part and eliminating the defects from the base surfaces of gas turbine buckets and blades. This process uses a high-pressure abrasive water jet machine to remove cracks. By automating this process, manual labor and an additional repair step may be eliminated and greater control of final blend dimensions may be achieved. While the following describes a method related to repair of gas turbine buckets, the inventive method is not limited to repair of coated turbine buckets and blades, or other coated turbine parts, but is applicable to a broad range of coated articles of manufacture.

Important aspects of the invention are removal of cracking from a gas turbine bucket or blade by re-contouring using a water jet, removal of coating and base metal cracks from the surface of a gas turbine bucket or blade by water jet, and a one setup process whereby a metallic coating is removed from the turbine component and then the surface of the component is machined to a desired shape. This process is done in a single setup step. Specific geometries for various turbine components through methods described below.

Another important aspect of the invention is that it allows exact shapes to be achieved in the repaired parts as opposed to the uncontrolled shapes that are created with a manual process. By controlling the final shape of the bucket, a quality repair can be assured that will stand up to all life requirements. This invention solves the manual labor problem by automating the material removal process.

Figure 1B:
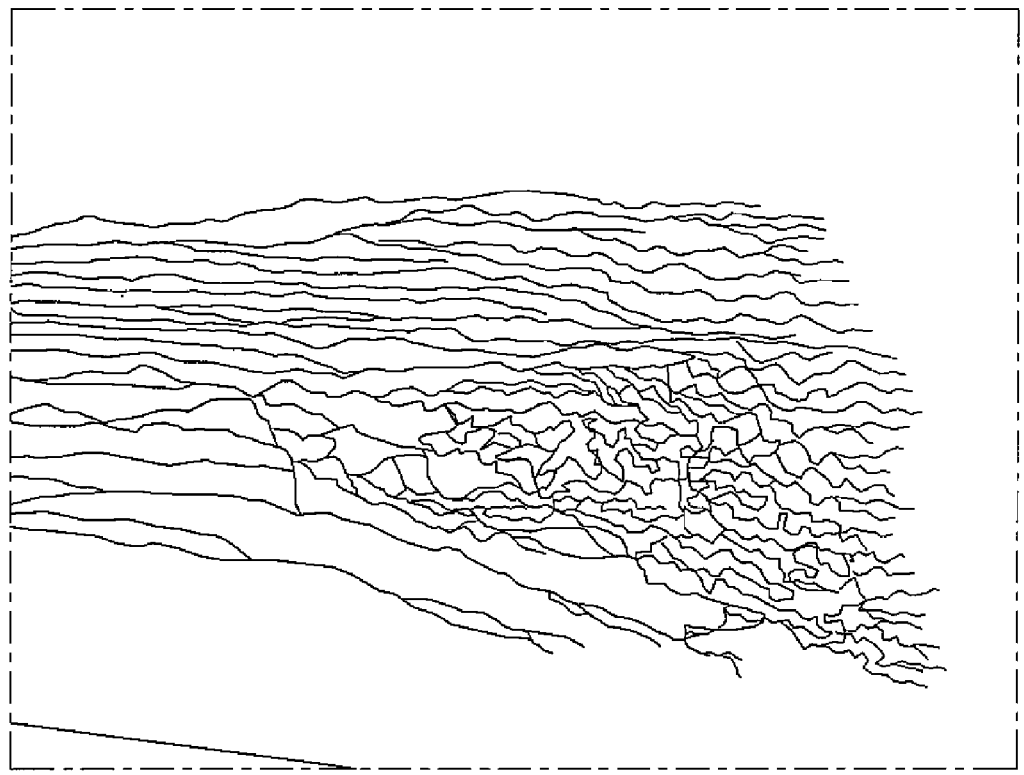
FIG. 1B illustrates a photograph of surface cracks in the airfoil of a gas turbine bucket.
Figure 1A:
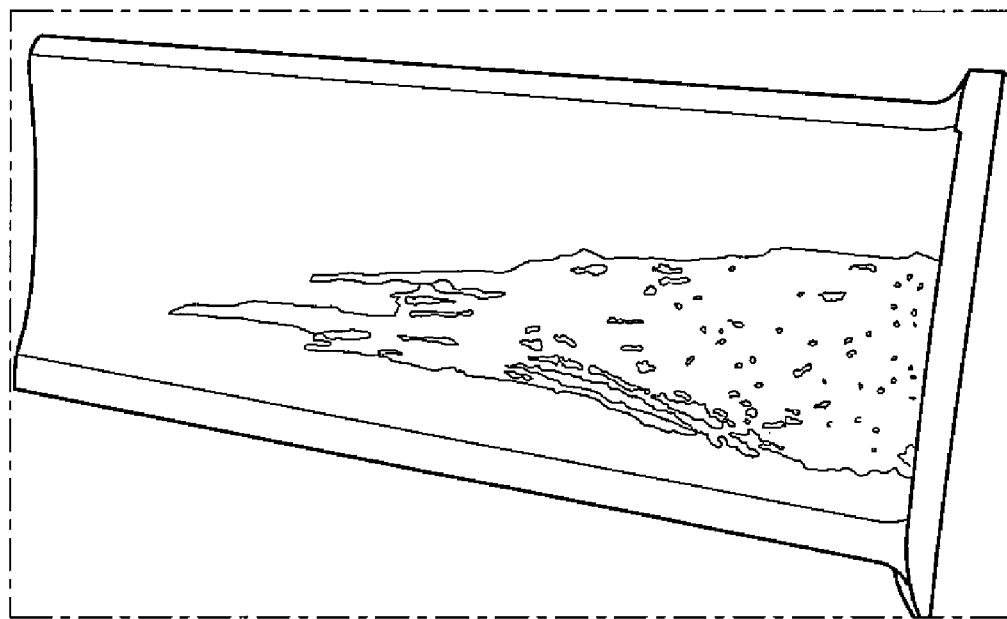
FIG. 1A illustrates a photograph under white light of surface cracks on an airfoil of a gas turbine bucket.
Figure 2A:
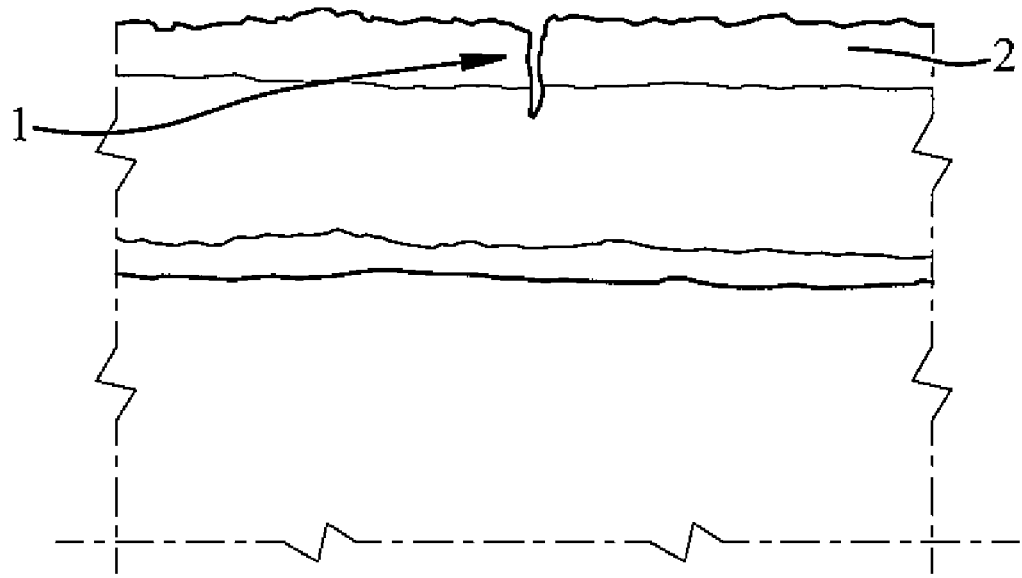
FIG. 2A illustrates a photograph of a crack in the coating of a leading concave external surface of an airfoil for a gas turbine bucket.
Figure 2B:
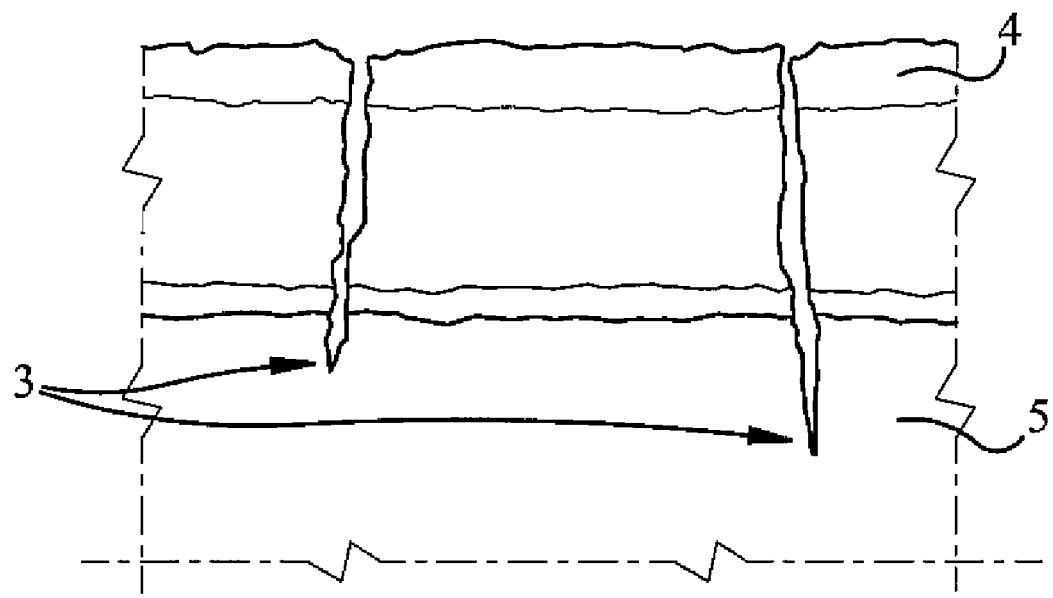
FIG. 2B illustrates a photograph of a crack, which propagates into the base metal, in the coating of a leading concave external surface of an airfoil for a gas turbine bucket.

FIG. 1A illustrates a photograph under white light of surface cracks on an airfoil of a gas turbine bucket. FIG. 1B illustrates a photograph of surface cracks in the airfoil of a gas turbine bucket. FIG. 2A illustrates a photograph of a crack 1 in the brittle coating 2 of a leading concave external surface of an airfoil for a gas turbine bucket. FIG. 2B illustrates a photograph of cracks 3 in the brittle coating 4 of a leading concave external surface of an airfoil for a gas turbine bucket, which propagates into the base metal 5.

Figure 3:
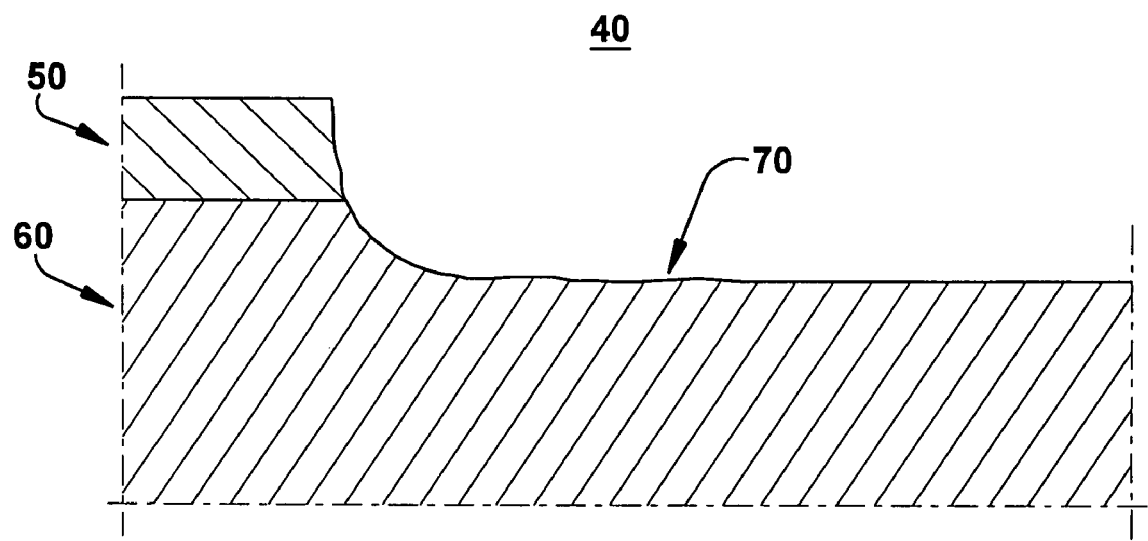
FIG. 3 illustrates removal of a coating thickness and controlled base metal removal with a water jet process.

Feasibility has been shown through efforts to qualify the water jet "stripping" process. It was demonstrated in the trials that not only could the coating material removal rate be controlled in 3D over the entire surface of the part, but also that the base metal removal could be controlled. Further the amount of base metal being removed could be controlled in small amounts so as to allow removal of surface defects without excessive removal of the base metal, thereby allowing contouring to specific shapes. The ability to create specific shapes is critical in certain articles of manufacture, such as turbine buckets where the shaping of the airfoil is necessary for the aerodynamic flow of gases through the turbine. FIG. 3 illustrates removal of a coating thickness and controlled base metal removal with a water jet process. An article of manufacture 40 is shown with a coating 50 and a base material 60. The coating 50 and base material 60 has been removed to a recontoured surface 70 with a jet spray.

Computer modeling has been performed to create part specific geometries that are at a safe design point for several different GE parts. This modeling gives various surface profiles of material removal that can be applied depending on the level of damage seen.

The part is first loaded into a machine and dimensionally scanned. This scan may be done using a non-contact or contact scanning tool. This tool should be capable of capturing the geometry of the loaded part and storing it as three dimensional data.

Figure 4:
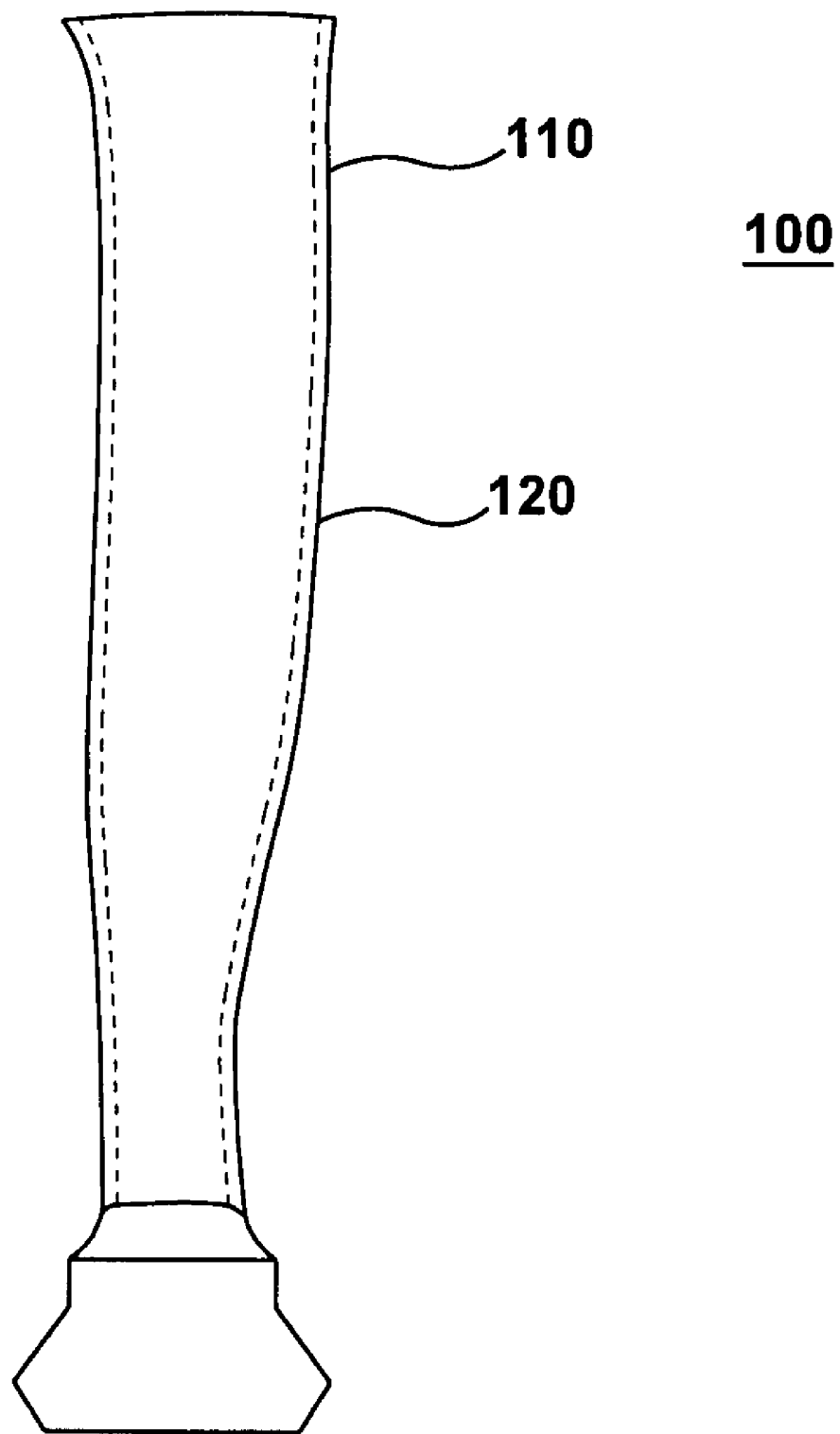
FIG. 4 illustrates an airfoil with a reduced dimensional contour.

Once the part has been scanned, a calculation may be performed to determine how much and from where material must be removed in order to reach the desired final shape. The final shape may be defined as a desired three-dimensional geometry or as an amount of material to be removed from given surfaces on any loaded part. FIG. 4 illustrates an exemplary turbine part for which a reduced dimensional profile has been established. An original dimensional outline 110 for a turbine blade 100 is depicted. A predetermined reduced contour profile 120 for the turbine blade 100 is illustrated.

Where the final shape is defined as a desired three-dimensional geometry, the final shape may be a set of predetermined reduced profiles. For example, the final shape of the article may be the original nominal design shape of the article reduced by a plurality of fixed thicknesses, resulting in progressively smaller predetermined reduced profiles. The desired geometry should be subtracted from the geometry measured by the dimensional scan in order to create a volume of material to be removed. Alternatively, a reduction of a differential amount of material from the shape, as measured by the dimensional scan, may be desired. Here a new target profile is not being established, but a differential of material is being removed from the as-built or actual in-service shape. In either case, the dimensional scan will provide the basis for where to begin the process.

During the method, a material removal rate for given dwell time, abrasive, pressure, and flow is established for each specific alloy or alloy and coating combination. These material removal rates are used to create a custom CNC program for each part that will remove the desired volume of material. In the case where a final absolute shape is not required, but only a delta from the existing part surfaces, the dimensional scan can be used to determine where the material should be removed in space without subtracting one geometry from another.

Once the part has been scanned and a custom CNC program has been created, the part is then processed by passing a high pressure abrasive jet of water over the surface of the part in a manner that removes the desired volume of material. The path of the water jet is controlled and moved through several axes in order to maintain a proper attitude in relation to the surface throughout the process. While the high-pressure abrasive water jet is being passed over the surface of a part, cracks are removed by removing substrate to or beyond the depth of the cracking. In addition to removing cracks in the part, coating may also be removed during the same setup.

Intermittent dimensional scans of the part may be taken to check the accuracy of the process in achieving the final desired shape and dimensions. Feedback from dimensional scans may be used in order to achieve the desired final dimension or shape.

The specific inventive methods for water jet stripping and recontouring a coated article of manufacture includes a broad method for creating water jet spraying programs and then a method for applying the water jet spraying to the specific articles of manufacture.

The method includes dimensionally scanning the coated article. From the dimensionally scanned article, a three-dimensional model is developed representing the article using computer-aided design (CAD)/computer-aided-engineering (CAE)/and computer-aided manufacturing (CAM) tools. A predetermined set of reduced dimensional profiles are applied to the model in order to establish both desired target volumes of material to be removed, as well as the final desired dimensions of the article. The target volumes are produced by subtracting the depth of removal at various locations from the surface of the mode. These volumes represent different amounts of material that may be removed from the article in order to achieve a final desired profile. Once a target volume of material to be removed is selected, a jet-spray program can be created to remove the desired volume of material in order to achieve a final desired profile of the article. The parameters for the program should be established previously by performing process characterization for each specific coating and base material.

The article must first be dimensionally scanned to determine the exact three-dimensional arrangement of the article. The step of dimensional scanning should include using at least one of a non-contact scanning tool and a contact scanning tool.

To strip away surface defects of the article, reduced dimensional profiles must be established such that the dimensions of the article are smaller than the nominal dimensions of the article by a predetermined thickness and by multiples of the predetermined thickness. Based on the surface defects normally experienced for coated gas turbine buckets and vanes, the predetermined reduced dimensional profiles reduce the surface in multiples of about 5 to 6 mils. However, the thickness of reduction for the reduced profile will depend on the specific article and the specific application.

The reduced dimensional profiles must be analyzed to confirm that they are satisfactory for subsequent operation. The analysis includes analyzing the mechanical, thermal and aerodynamic properties of the target profiles. The step of analyzing whether the reduced profiles are satisfactory for subsequent operation also includes checking for conformity against equipment design criteria. The design criteria may include computer codes and design manuals. If the design criteria are satisfied, then the target profiles may be accepted as satisfactory for subsequent operation.

Various material coatings that may be employed in coatings for the article of manufacture and the underlying base material have different strength and toughness characteristics. A jet spray must take the different characteristics into account while removing the coating and then underlying base material. The specific factors that are determined in the method are a material removal rate for a given dwell time, an abrasive type and concentration, a jet pressure and a jet flow rate. These parameters may be separately established for the coating and the base material.

However, it may be desirable, if supported by test data for the specific coating and base material, to employ these same parameters for both the coating and the base material.

While the above-described method is generally applicable to coated articles of manufacture, the method is specifically applicable to gas turbine coated parts and to coated buckets of the gas turbine.

When the method for a specific part has been created, as described above, the application of the method is described in the following. Initially, a depth of damage to the underlying base material of the article must be determined. When the depth of damage has been determined, the method provides for selecting a recontour profile from a set of reduced contour profiles for the article. A jet spray program must be selected for the specific coating on the article. The jet spray program for the specific alloy composition of the underlying base material is selected. The jet spray programs are then applied to remove the specific coating and the damage on the base surface of the article down to the reduced contour profile.

The depth of damage to the underlying base material may be determined by the process of worm trailing. Worm trailing is a process wherein the depth of damage to a surface is determined by grinding small sample areas of the defect until no further surface defect is present. The sampling of defect depth in this manner provides the investigator with an estimate of the depth of the surface defect without the need to grind the entire surface.

After determining the depth of the surface defects by worm trailing, the surface may be recontoured choosing a reduced contour profile adequate to remove the estimated depth of defect and then inspecting the article to determine if the defect is fully removed. If the surface defect is not fully removed, then further worm trailing is performed to determine what further surface recontouring should be performed.

Alternatively, the surface defect may be removed to the extent allowed by recontouring to the a first recontoured surface and then inspecting. If the surface defect is not fully removed, then the surface may again be recontoured to progressively deeper reduced contour profiles and inspected until the surface defect is fully removed.

When the surface defect has been fully removed by jet stripping to a predetermined reduced contour, the finished article is dimensionally checked to confirm that the final dimensions fall within the acceptable dimensions for continued operability of the article.

A method is further provided for water jet stripping and recontouring of a coated article of manufacture such that the shape of the article is in conformance with an acceptable design profile such that only a difference from the shape of the actual article must be removed. The method first dimensionally scans the article. The dimensions of the article are then compared against a nominal design shape of the article. If the article is determined to be less than a predetermined deviation from the nominal design shape of the article, then a delta of material may be removed from the existing profile of the article rather than water jet stripping and recontouring to a predetermined reduced profile shape.

The depth of damage on the base surface of the article is determined based on worm trailing or other testing methods known in the art. Jet spray programs are then selected for the specific coating material and the specific alloy composition of the base material. The jet spray programs are then applied to remove the specific coating and remove a predetermined depth off the existing base surface of the article. The predetermined depth to be removed from the base surface of the article is at least the depth of damage as determined by the worm trailing or other methods.

Figure 5:
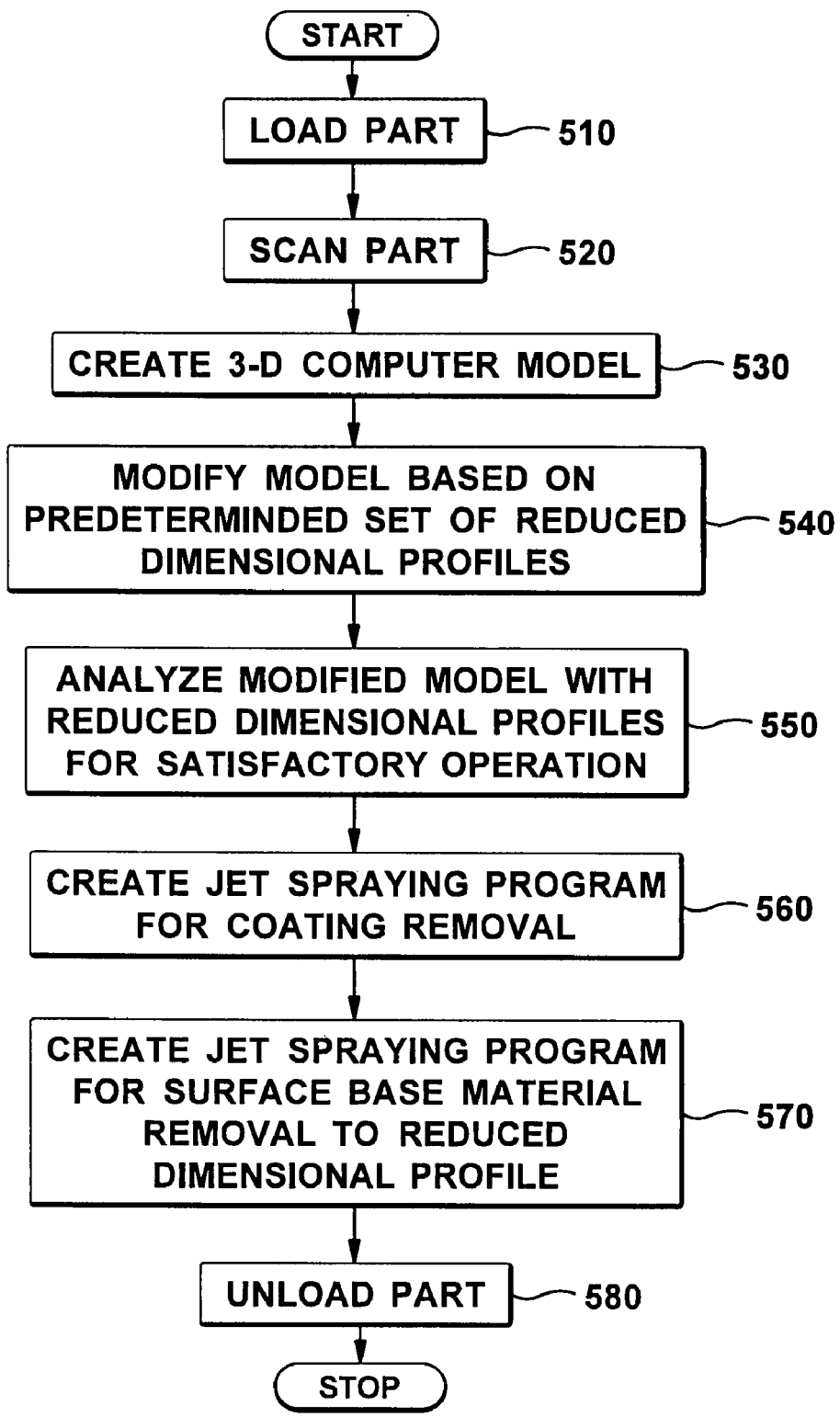
FIG. 5 illustrates a flowchart describing a method for creating a water jet spraying program for defect removal from an article of manufacture.

FIG. 5 illustrates a flowchart describing a method for creating a water jet stripping and recontouring program for defect removal from an article of manufacture. In step 510, the article is loaded into device. In step 520, the article is scanned, where the scanner may be either a contact or non-contact scanning tool. A three dimensional model of the article of manufacture is created based on the scan using CAD/CAE/CAM tools, known in the art, in step 530. The three dimensional model is modified based on a predetermined set of reduced dimensional profiles, in step 540, to define successively deeper cuts that may be used to remove surface defects on the article. In step 550, the model with reduced dimensional profiles is analyzed to confirm that the article, when machined to the reduced profile, is satisfactory for continued operation. In step 560 a three-dimensional jet spray program is created for removal of the coating. In step 570, a three dimensional jet spray program is created for removal of the surface base material to the reduced dimensional profile. The article is removed from the device in step 580.

Figure 6:
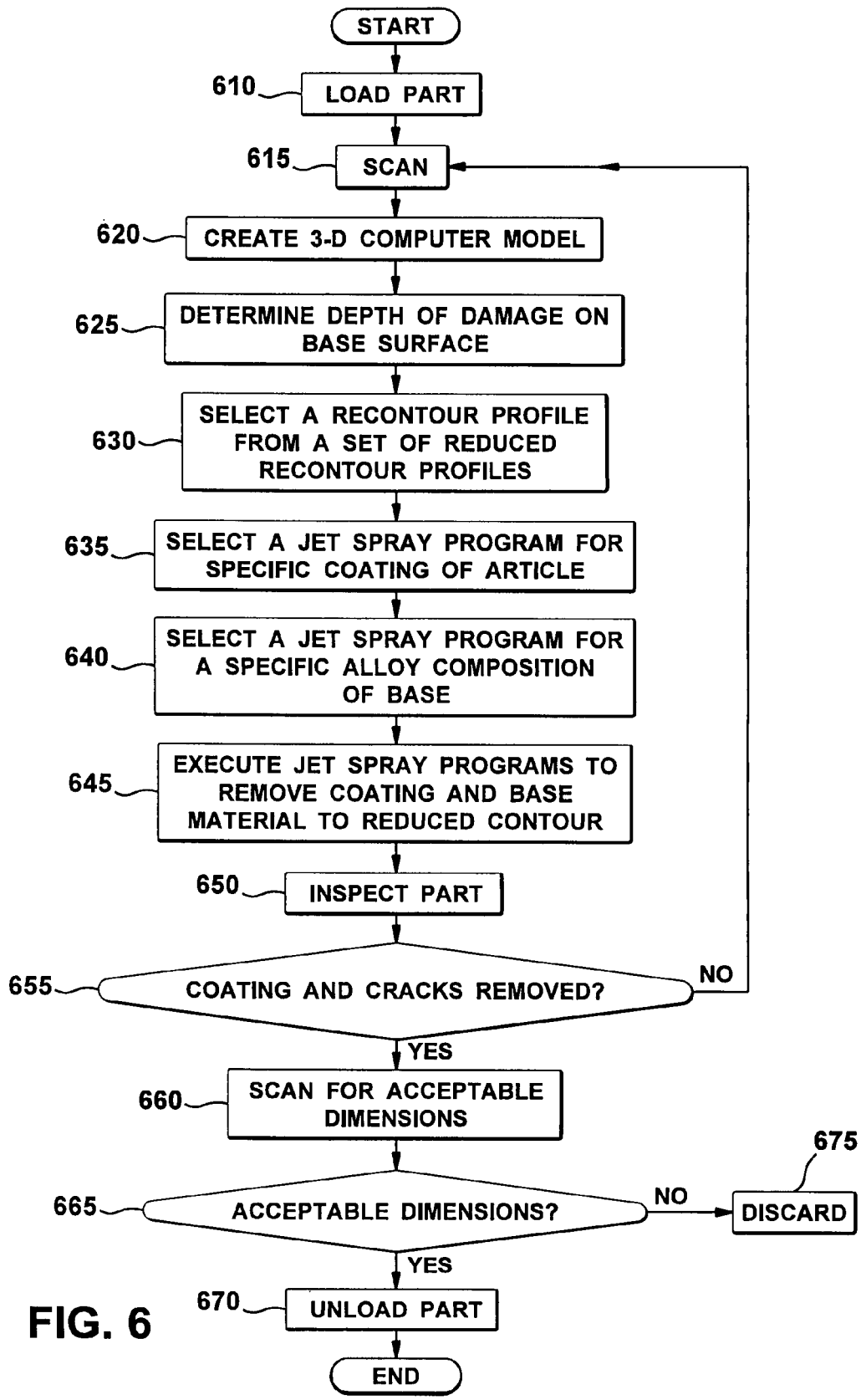
FIG. 6 illustrates a flowchart describing a method for execution of a water jet spraying program for defect removal to a predetermined reduced dimension profile from an article of manufacture.

FIG. 6 illustrates a flowchart describing a method for execution of a water jet stripping and recontouring program for defect removal to a predetermined reduced dimension profile from an article of manufacture. In step 610, the article is loaded into a water jet stripping and recontouring device. In step 615, the article is scanned, where the scanner may be either a contact or non-contact scanning tool. A three dimensional model for the article is created in step 620. The depth of damage on the base surface is first determined in step 625. After the depth of damage has been determined, a recontour profile is selected from the set of reduced contour profiles for the articles in step 630.

In step 635, a jet spray program is selected for removal of the specific coating on the article. In step 640, a jet spray program is selected for removal of the specific alloy composition of the base. In step 645, the jet spray programs for removing the coating and the base material down to the reduced contour profile are executed. In step 650, the article is inspected. If it is determined in step 655 that the coating and cracks have been removed, then the article may be scanned in step 660 to confirm that it falls within acceptable dimensions for future service. If the scan indicates in the test of step 665 that the part falls within acceptable dimensions, the part is unloaded in step 670 for return to service. If the coating and cracks have not been removed as determined in step 655, then the article is scanned again in step 615 for further contouring. If the test in step 665 shows from scan results that dimensions are below the minimum acceptable, then the part may not be reused but must be discarded in step 675.

Figure 7:
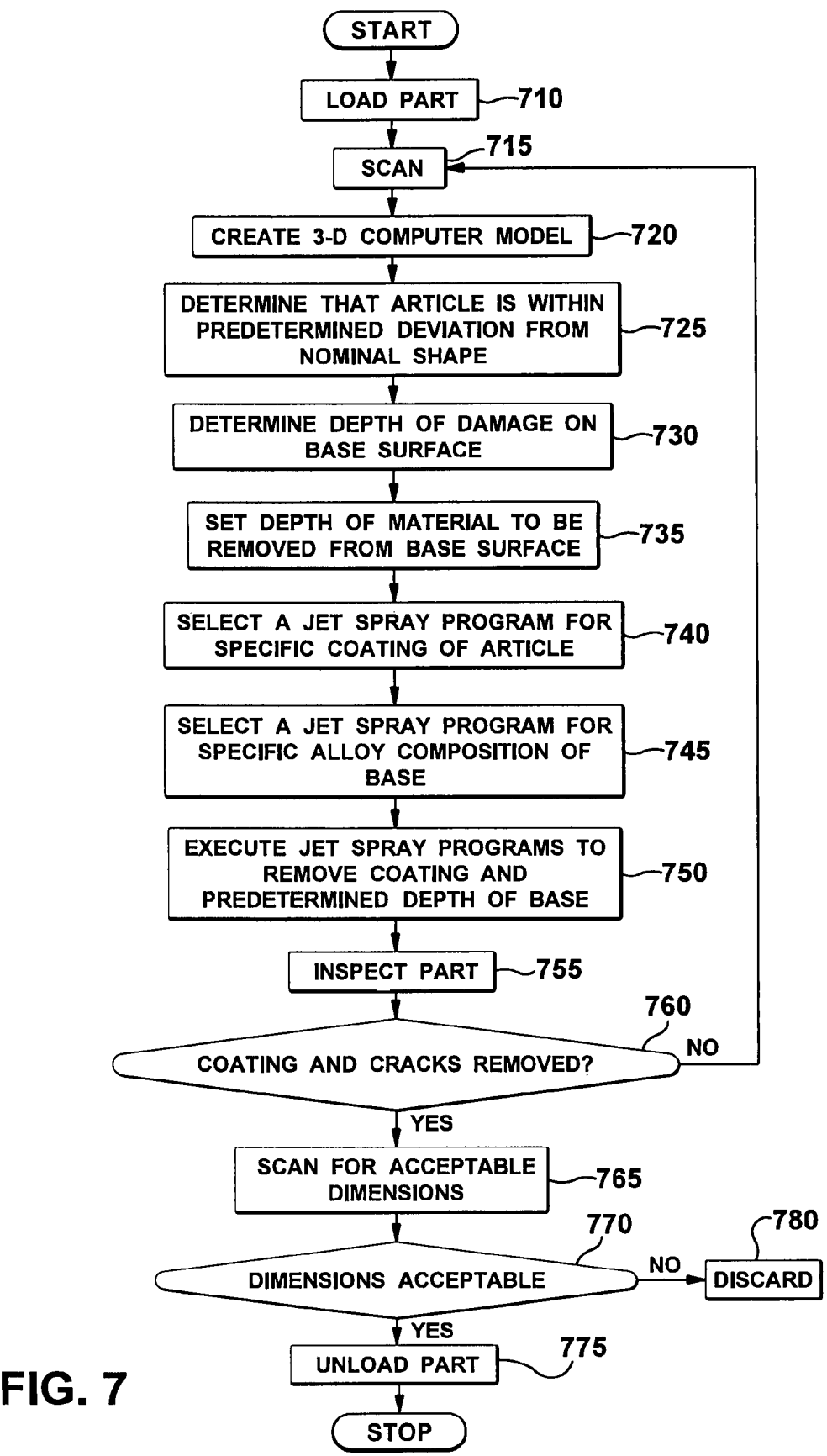
FIG. 7 illustrates a flowchart describing a method for execution of a water jet spraying program for removal of a predetermined depth of material from the surface of an article of manufacture.

FIG. 7 illustrates a flowchart describing a method for execution of a water jet spraying program for removal of a predetermined depth of material from the surface of an article of manufacture. In step 710, the article is loaded into a water jet stripping and recontouring_device. In step 715, the article is scanned, where the scanner may be either a contact or non-contact scanning tool. A three dimensional model for the article is created in step 720. In step 725, it is determined whether the shape for the article is within a predetermined deviation from the nominal dimensions for the article. If the shape of the article is within a predetermined deviation from the nominal dimensions of the article, the process is continued. Otherwise, if the shape is not within the predetermined deviation in step 725, then another recontouring procedure must be utilized.

The depth of damage on the base surface is determined in step 730. After the depth of damage has been determined, a recontour profile is selected from the set of reduced contour profiles for the articles in step 735. In step 740, a jet spray program is selected for removal of the specific coating on the article. In step 745, a jet spray program is selected for removal of the specific alloy composition of the base is selected. In step 750, the jet spray programs for removing the coating and the base material are executed to reduce the shape of the article to a predetermined depth. In step 755, the article is inspected. If the coating and cracks have been removed as determined in step 760, then the article may be scanned in step 765 to confirm that it falls within acceptable dimensions for future service. If the scan indicates in the test of step 770 that the part falls within acceptable dimensions for continued operation of the part, the part is unloaded in step 775 for return to service. If the coating and cracks have not been removed as determined in step 760, then the article is rescanned in step 715 for further contouring. If the test in step 770 shows from scan results that dimensions are below the minimum acceptable, then the part may not be reused but discarded in step 780.

This invention will provide a faster, higher quality, more cost effective way to repair articles of manufacture and more specifically, gas turbine buckets and blades with coating related surface cracking issues. One advantage of this process is that it eliminates cracks that extend into substrate material as well as a non-serviceable coating in one single setup. The alternative to this process is to mechanically or chemically strip the coating and then separately remove the cracking through either a manual blending process or through an automated machining process with multiple setups.

While only certain features of the invention have been illustrated and described herein, many modifications and changes will occur to those skilled in the art. Further while the application of the method to exemplary applications for coated gas turbine components have been provided, the method has general application to coated articles of manufacture. It is therefore to be understood that the appended claims are intended to cover all such modifications and changes as fall within the true spirit of the invention.

The invention claimed is:

1. A method for creating a water jet stripping and recontouring program for a coated article of manufacture, the method comprising:
   dimensionally scanning the coated article;
   establishing a three-dimensional model for the coated article;
   establishing a predetermined set of reduced dimensional profiles for recontouring as applied to the scanned article;
   analyzing whether the reduced profiles are satisfactory;
   establishing a jet spraying program for removal of the coating; and
   establishing a jet spraying program for removal of the surface base material to each predetermined reduced dimensional profile.

2. The method for creating a water jet stripping and recontouring program for a coated article of manufacture according to claim 1, the step of dimensionally scanning the coated article comprising:
   dimensionally scanning the article using at least one of a non-contact scanning tool and a contact scanning tool.

3. The method for creating a water jet stripping and recontouring program for a coated article of manufacture according to claim 1, the step of establishing a predetermined set of reduced dimensional profiles comprising:
   establishing reduced dimension profiles being smaller than nominal dimensions of the article by a predetermined thickness and by multiples of the predetermined thickness.

4. The method for creating a water jet stripping and recontouring program for a coated article of manufacture according to claim 1, the step of analyzing whether the reduced profiles are satisfactory comprising:
   analyzing mechanical properties of the target profile;
   analyzing thermal properties of the target profile; and
   analyzing aerodynamic properties of the target profile.

5. The method for creating a water jet stripping and recontouring program for a coated article of manufacture according to claim 4, the step of analyzing whether the reduced profiles are satisfactory further comprising:

checking for conformity with design criteria; and accepting adequacy of the reduced profiles if the design criteria is satisfied.

6. The method for creating a water jet stripping and recontouring program for a coated article of manufacture according to claim 1, the step of establishing a jet spraying program for removal of the specific coating material comprising:

determining a material removal rate for a given dwell time, an abrasive type and concentration, a jet pressure and the a jet flow rate for the specific coating material.

7. The method for creating a water jet stripping and recontouring program for a coated article of manufacture according to claim 1, the step of the step of establishing a jet spraying program for removal of the the specific alloy material of the article comprising:

determining a material removal rate for a given dwell time, an abrasive type and concentration, a jet pressure and a jet flow rate for the alloy material.

8. The method for creating a water jet stripping and recontouring program for a coated article of manufacture according to claim 1, wherein the coated article of manufacture comprises: a coated part for a gas turbine.

9. The method for creating a water jet stripping and recontouring program for a coated article of manufacture according to claim 8, wherein the coated part for a gas turbine comprises: at least one of a bucket and a blade.

* * * * *